(12) United States Patent
Hamama

(10) Patent No.: US 7,739,214 B2
(45) Date of Patent: Jun. 15, 2010

(54) TABLE INTERPOLATION METHODS AND SYSTEMS

(75) Inventor: Wajdi B. Hamama, Whitmore Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 510 days.

(21) Appl. No.: 11/784,516

(22) Filed: Apr. 6, 2007

(65) Prior Publication Data
US 2008/0246997 A1 Oct. 9, 2008

(51) Int. Cl.
*G06F 17/00* (2006.01)
*G06F 7/00* (2006.01)

(52) U.S. Cl. .................. 706/46; 701/106; 701/111

(58) Field of Classification Search ............ 706/46; 701/106, 111; 123/673
See application file for complete search history.

(56) References Cited

U.S. PATENT DOCUMENTS

| | | | | |
|---|---|---|---|---|
| 4,646,697 A * | 3/1987 | Grob et al. | ............. | 123/406.23 |
| 4,763,627 A * | 8/1988 | Tomisawa | ............. | 123/674 |
| 4,913,117 A * | 4/1990 | Hashimoto et al. | ....... | 123/406.3 |
| 4,971,007 A * | 11/1990 | Gopp et al. | ............ | 123/406.23 |
| 5,090,382 A * | 2/1992 | Bolander et al. | ....... | 123/406.33 |
| 5,150,301 A * | 9/1992 | Kashiwabara et al. | ....... | 701/106 |
| 5,651,353 A * | 7/1997 | Allston | ............. | 123/673 |
| 6,904,352 B2 * | 6/2005 | Hawkins et al. | ............ | 701/101 |
| 7,069,909 B2 * | 7/2006 | Pozar et al. | ............. | 123/478 |
| 2005/0085981 A1 * | 4/2005 | Cicala et al. | ............. | 701/54 |
| 2007/0294016 A1 * | 12/2007 | Braun et al. | ............. | 701/67 |

OTHER PUBLICATIONS

Aus, H. M. and Korn, G. A. 1969. Table-Lookup/Interpolation Function Generation for Fixed-Point Digital Computations. IEEE Trans. Comput. 18, 8 (Aug. 1969), 745-749.*

Flammini, A. Marioli, D. Taroni, A. Application of an optimal look-up table to sensor data processing. Instrumentation and Measurement, IEEE Transactions on. Aug. 1999. vol. 48, Issue 4. pp. 813-816.*

Catunda, S.Y.C. Saavedra, O.R. FonsecaNeto, J.V. Morais, M.R.A. Look-up table and breakpoints determination for piecewise linear approximation functions using evolutionary computation. Instrumentation and Measurement Technology Conference, 2003. IMTC '03. Proceedings of the 20th IEEE. May 20-22, 2003. vol. 1, On pp. 435-440.*

Catunda et al. Optimized Look-up Table for Inter-Mesurand Compensation. IEEE Instrumentation and Measurement Technology Conference. Budapest, Hungary, May 21-23, 2001.*

\* cited by examiner

*Primary Examiner*—Donald Sparks
*Assistant Examiner*—David H Kim

(57) ABSTRACT

A control system is provided. This system generally includes a table datastore that stores data in a table format wherein the table format includes a plurality of zones. A data storage module stores learned data to one or more of the plurality of zones. A data access module generates a table output by retrieving the learned data from one or more of the plurality of zones and interpolating between the learned data.

13 Claims, 4 Drawing Sheets

TABLE INTERPOLATION METHODS AND SYSTEMS

FIELD

The present disclosure relates to methods and systems for storing and interpolating learned values from a table in memory.

BACKGROUND

The statements in this section merely provide background information related to the present disclosure and may not constitute prior art.

Vehicle control modules typically include memory for storing control software and predetermined calibrations. In addition, vehicle parameters learned during vehicle operation can be stored to memory for use by the control software. In some cases, the learned vehicle parameters are stored in a table format that can be interpolated. The table includes first and second fixed axes that are each defined by fixed breakpoints. For each breakpoint pair for the first and second axes, either an initialization value or a learned value is stored. Access parameters can then be used to lookup the values from the table. The interpolation is performed between the values in the table that are nearest the access parameters. In the case where the nearest values have not been learned, the result of the interpolation can be skewed thus, affecting the results of the control software.

SUMMARY

Accordingly, a control system is provided. This system generally includes a table datastore that stores data in a table format wherein the table format includes a plurality of zones. A data storage module stores learned data to one or more of the plurality of zones. A data access module generates a table output by retrieving the learned data from one or more of the plurality of zones and interpolating between the learned data.

In other features, a method of interpolating data from a table in memory is provided. This method includes: determining a location in the table based on input parameters; traversing zones in the table for learned data nearest the location; and generating an output based on an interpolation between the nearest learned data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
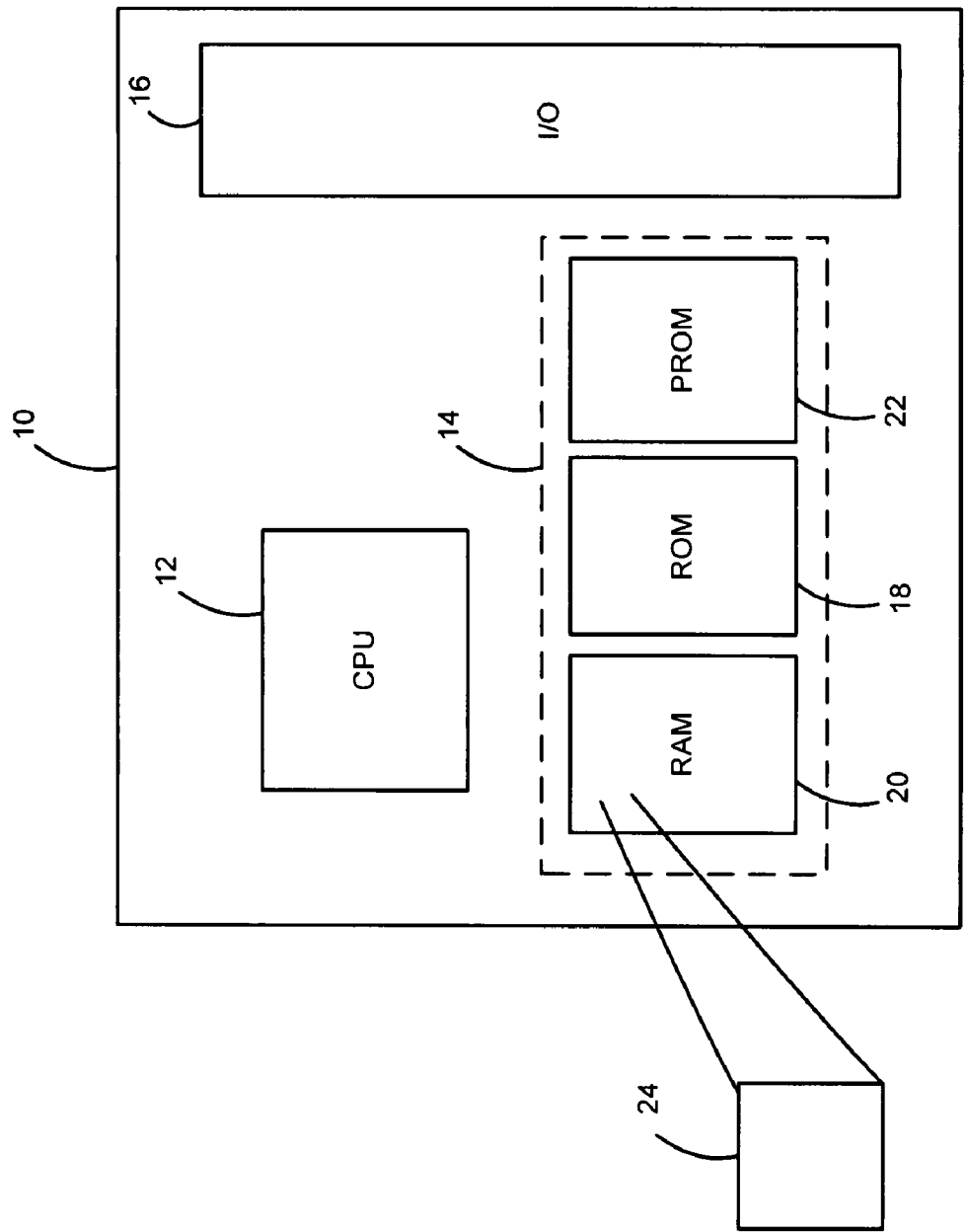
FIG. 1 is a block diagram illustrating a control module including a table interpolation system according to various aspects of the present teachings.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, an exemplary control module 10 is shown. As can be appreciated, the control module 10 can be a vehicle control module that controls one or more sub-systems of a vehicle, such as, but not limited to an engine system, a transmission system, and a throttle system. The control module 10 is shown to include a processor 12, memory 14, and an input/output device 16. The input/output device 16 receives signals from and transmits signals to one or more components of the sub-system system. The processor 12 executes one or more software instructions stored in memory 14. The memory 14 can include, but is not limited, read only memory (ROM) 18, random access memory (RAM) 20, programmable read only memory (PROM) 22, a cache, a stack, or the like.

In various embodiments, the software instructions are stored in and accessed from the PROM 22. Based on various embodiments of the present teachings, the software instructions store information to and access information from one or more interpolation tables 24 based on the table interpolation systems and methods as discussed below. The one or more interpolation tables 24 according to various aspects of the present teachings are stored in and accessed from RAM 20. In various embodiments, the interpolation tables 24 can be stored in a nonvolatile RAM that does not lose the stored information when power is removed. Definitions for one or more axes for the one or more interpolation tables 24 according to various aspects of the present teachings are stored in and accessed from ROM 18.

Figure 2:
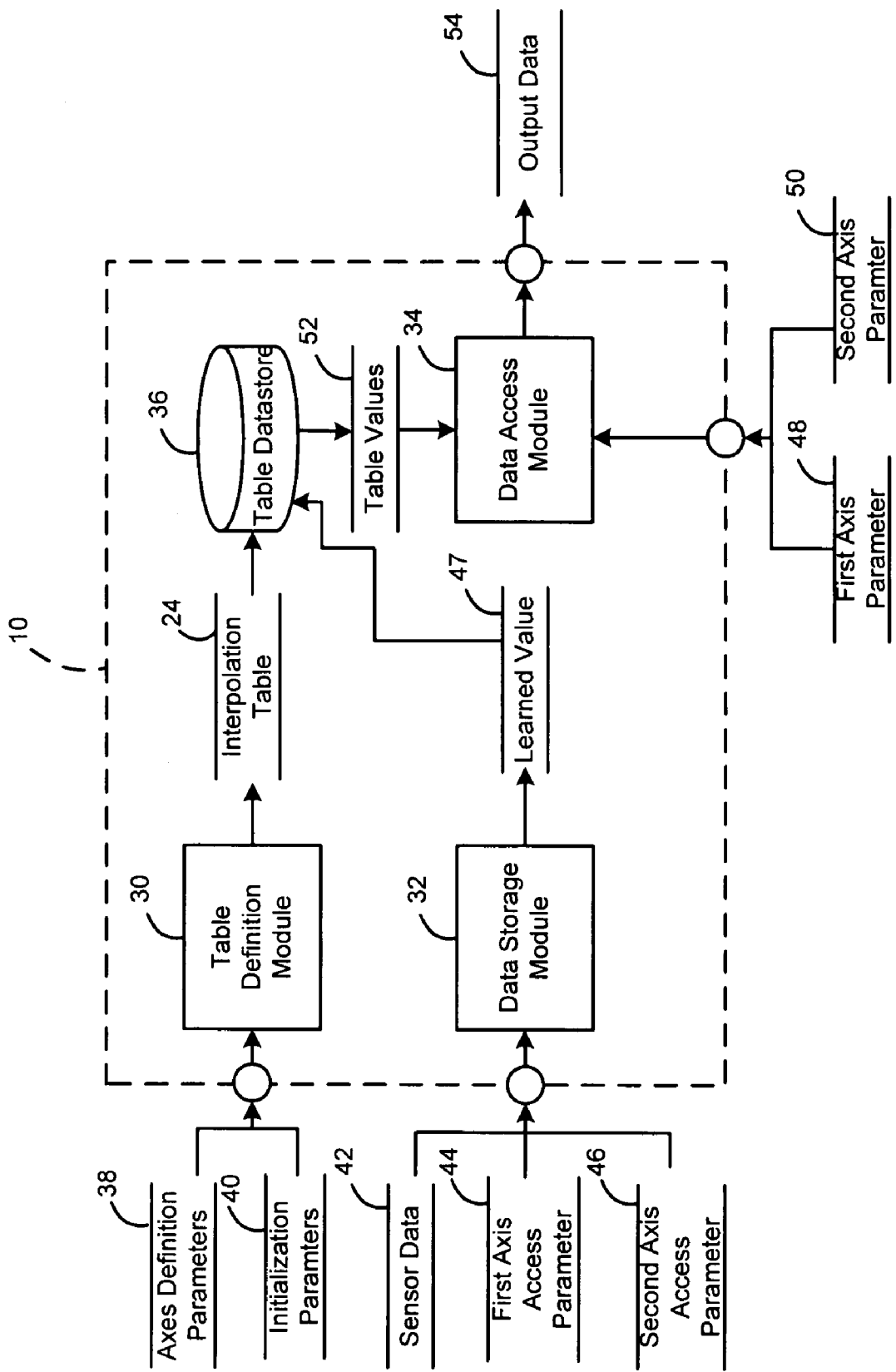
FIG. 2 is a dataflow diagram illustrating an exemplary table interpolation system according to various aspects of the present teachings.

Referring now to FIG. 2, a dataflow diagram illustrates an exemplary table interpolation system that may be embedded within the control module 10. Various embodiments of table interpolation systems according to the present disclosure may include any number of sub-modules embedded within the control module 10. As can be appreciated, the sub-modules shown may be combined and/or further partitioned to similarly store information to and access information from the interpolation tables 24. Inputs to the table interpolation system may be sensed information, information determined by other control modules (not shown), and/or information determined by other sub-modules (not shown) within the control module 10. In various embodiments, the control module 10 of FIG. 2 includes a table definition module 30, a data storage module 32, a data access module 34, and a table datastore 36.

The table definition module 30 receives as input axes definition parameters 38 and initialization parameters 40. The table definition module 30 defines the interpolation table 24 for example, to be a two-dimensional table including a first axis and a second axis. The first axis can be a fixed axis including a plurality of breakpoints, each breakpoint being defined by the axes definition parameters 38. The second axis can be a variable axis including a plurality of breakpoints that are variably defined for each breakpoint of the first axis based on the axes definition parameters 38. The second axis breakpoints can be selected so as to optimize the use of the table space. For example, in the case of an engine control module, the first axis can represent engine speed and the second axis can represent air per cylinder. If an engine never operates at very high RPMs and very low air per cylinder simultaneously, then for the breakpoints representing the high RPM, only breakpoints representing high air per cylinder are included in the second axis.

The breakpoints of the first axis and the second axis define a plurality of zones in the interpolation table 24. The table definition module 30 stores the initialization parameters 40 in each of the plurality of zones. In various embodiments, the initialization values can include a third, hidden dimension that indicates whether the zone has been learned. For example, the zones can be initialized to a negative value. Once the zone has been learned, as will be discussed in more detail below, the value becomes positive. The positive factor then indicates that the zone can be used in the interpolation as will be discussed in more detail below. The table definition module 30 stores the interpolation table 24 in the table datastore 36.

The data storage module 32 receives as input sensor data 42, a first axis parameter 44, and a second axis parameter 46. The data storage module 32 learns table values based on the sensor data 42. The learned value 47 is stored to a zone in the interpolation table 24 that is defined by the first axis parameter 44 and the second axis parameter 46. In various embodiments, the data storage module 32 determines whether enough data has been gathered before storing the learned value to a zone in the interpolation table. For example, the sensor data 42 for that zone must be learned for x seconds before storing. In various embodiments, the first axis parameter 44 and the second axis parameter 46 can be based on current operating conditions. For example, relating to the engine control module example above, the first axis parameter 44 can be a current engine speed and the second axis parameter 46 can be a current air per cylinder.

Figure 3:
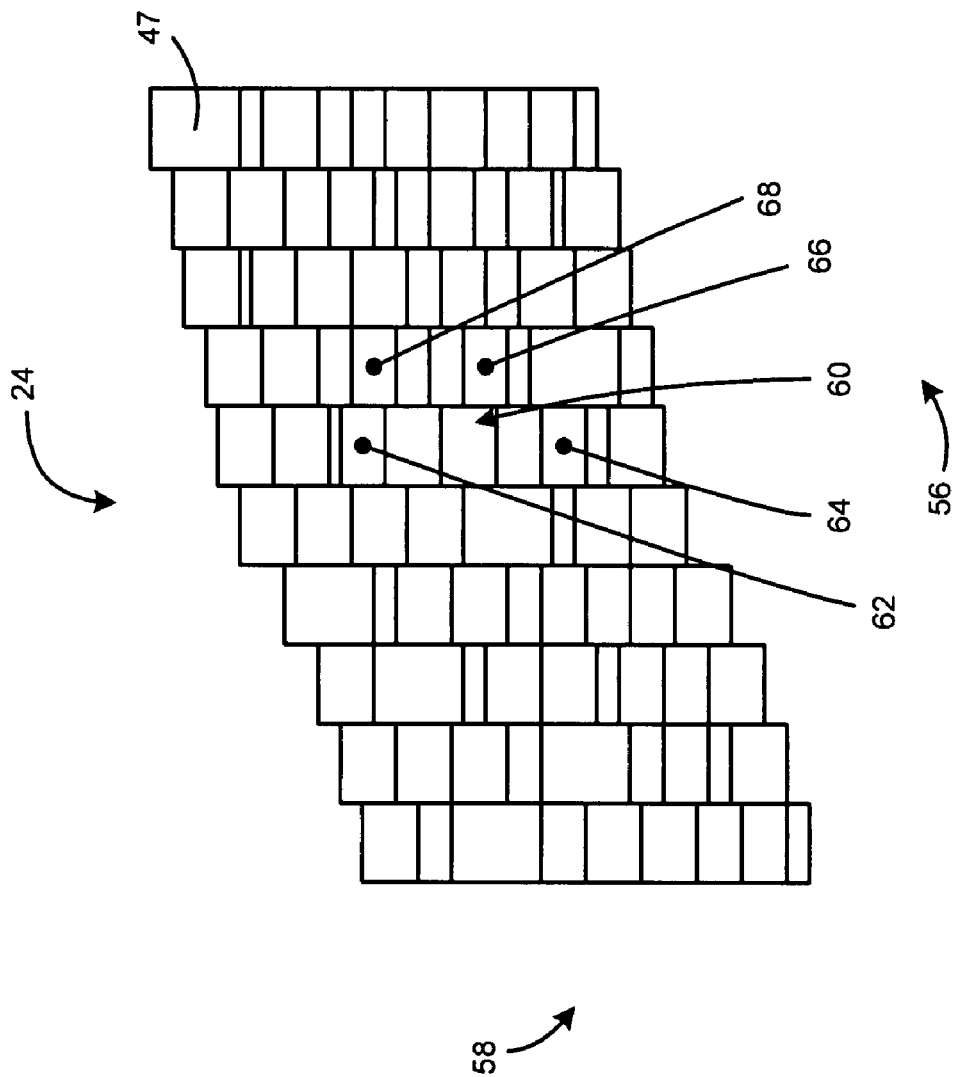
FIG. 3 is a block diagram illustrating an exemplary two-dimensional table including learned values of the table interpolation system according to various aspects of the present teachings.

The data access module 34 receives as input a first axis access parameter 48 and a second axis access parameter 50. The data access module 34 retrieves from the interpolation table 24 stored in the table datastore 36 learned table values 52 in zones nearest the first axis access parameter 48 and the second axis access parameter 50. The data access module 34 generates output data 54 by interpolating the learned table values 52. As shown in FIG. 3, an exemplary two-dimensional interpolation table 24 includes a first axis 56 that is defined by a plurality of predefined breakpoints and a second axis 58 that is defined by a plurality of breakpoints that can be variably defined for each breakpoint of the first axis 56. A learned value 47 can be stored to one or more zones in the table (indicated by the shaded areas). Values of non-learned zones can remain set to the initialization parameters 40. When accessing the information stored in the interpolation table 24, the data access module 34 determines a location 60 in the table based on the input parameters 48 and 50 and determines learned values 62, 64, 66, and 68 nearest the location 60. Based on the learned values 62, 64, 66, and 68 nearest the location 60, the data access module 34 generates output data 54 by interpolating between the learned values 62, 64, 66, and 68. The data access module 34 then provides the output data 54 for use by other modules or systems.

Figure 4:
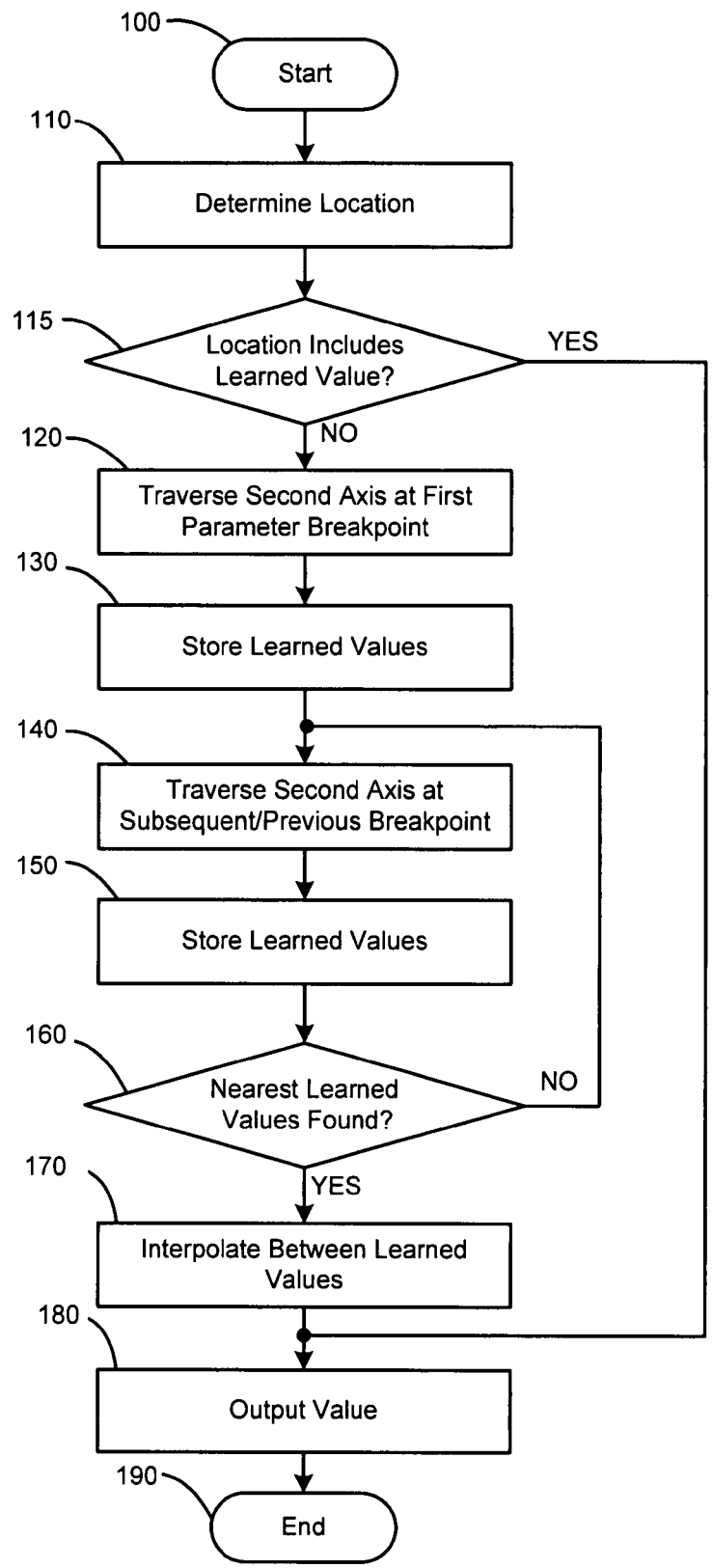
FIG. 4 is a flowchart illustrating an exemplary table interpolation method according to various aspects of the present teachings.

Referring now to FIG. 4 and with continued reference to FIG. 3, a flowchart illustrates an exemplary table interpolation method that can be performed by the table interpolation system in accordance with various aspects of the present disclosure. As can be appreciated, the order of execution of the steps of the exemplary table interpolation method can vary without altering the spirit of the method. The method may be initiated based on a request to access information from the interpolation table 24.

In one example, the method may begin at 100. The location 60 in the interpolation table 24 is determined based on the input parameters 48 and 50 (FIG. 2) at 110. If the location includes a learned value at 115, the value is output at 180. If, however, the location does not include a learned value at 115, the second axis 58 is traversed for the breakpoint of the first axis 56 corresponding to that location 60 and the value of each zone is evaluated at 120. For the two closest zones that include a learned value, the learned values 62 and 64 are retrieved and temporarily stored for interpolation at 130.

Thereafter, the second axis 58 is traversed for a breakpoint of the first axis 56 corresponding to the previous breakpoint or the subsequent breakpoint from the location 60 at 140. In the example of FIG. 3, the second axis corresponding to the subsequent breakpoint from the location 60 is illustrated. For the two closest zones that include a learned value, the learned values 66 and 68 are retrieved and temporarily stored for interpolation at 150. Once the four nearest learned values are temporarily stored at 160, the values are interpolated at 170. The result of the interpolation is then output at 180. Otherwise, if not all four values are found at 160, the method loops back and traverses the second axis 58 for a subsequent or previous breakpoint of the first axis 56 at 140. The method may end at 190.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system, comprising;
    a table datastore that stores data in a table format, wherein the table format includes a plurality of zones;
    a table definition module that initializes each of the plurality of zones to a predetermined value that indicates that the value in the zone has not been learned;
    a data storage module that replaces a plurality of the predetermined values with values learned during operation of a vehicle; and
    a data access module that determines a location of a zone in the table format based on input parameters, that retrieves learned values from zones nearest the location when the value in the zone corresponding to the location is equal to the predetermined value, and that generates a table output by interpolating between the learned values retrieved from the zones nearest the location.

2. The control system of claim 1 wherein the plurality of zones of the table format are defined by a first fixed axis and a second variable axis.

3. The control system of claim 1, wherein the input parameters include an engine speed parameter and an air-per-cylinder parameter.

4. The control system of claim 1, wherein the table definition module initializes each of the plurality of zones to a negative value that indicates that the value in the zone has not been learned.

5. The control system of claim 4, wherein the data storage module replaces the plurality of the predetermined values with positive values that indicate that the value in the zone has been learned.

6. The control system of claim 1, wherein the data access module retrieves the value in the zone corresponding to the location when the value in the zone corresponding to the location is a learned value.

7. A method of interpolating data from a table in memory, comprising:
- storing data in a table format, wherein the table format includes a plurality of zones;
- initializing each of the plurality of zones to a predetermined value that indicates that the value in the zone has not been learned;
- replacing a plurality of the predetermined values with values learned during operation of a vehicle;
- determining a location of a zone in the table format based on input parameters;
- traversing zones in the table format for learned values nearest the location;
- retrieving learned values from zones nearest the location when the value in the zone corresponding to the location is equal to the predetermined value; and
- generating an output based on an interpolation between the learned values retrieved from the zones nearest the location.

8. The method of claim 7 wherein the traversing comprises traversing a plurality of zones in the location table based on the input parameters.

9. The method of claim 7 further comprising defining the table to include a first fixed axis and a second variable axis.

10. The method of claim 7, wherein the input parameters include an engine speed parameter and an air-per-cylinder parameter.

11. The method of claim 7, further comprising initializing each of the plurality of zones to a negative value that indicates that the value in the zone has not been learned.

12. The method of claim 11, further comprising replacing the plurality of the predetermined values with positive values that indicate that the value in the zone has been learned.

13. The method of claim 7, further comprising retrieving the value in the zone corresponding to the location when the value in the zone corresponding to the location is a learned value.

* * * * *